(12) United States Patent
Versaevel et al.

(10) Patent No.: US 12,600,119 B2
(45) Date of Patent: Apr. 14, 2026

(54) METHOD FOR MANUFACTURING AN ACOUSTIC PANEL WITH OBLIQUE CAVITIES

(71) Applicant: SAFRAN NACELLES, Gonfreville-l'Orcher (FR)

(72) Inventors: Marc Versaevel, Moissy-Cramayel (FR); Pierre-Yves Gini, Moissy-Cramayel (FR); Hugo Boistelle, Moissy-Cramayel (FR); Bertrand Léon Marie Desjoyeaux, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 101 days.

(21) Appl. No.: 18/686,592

(22) PCT Filed: Aug. 29, 2022

(86) PCT No.: PCT/FR2022/051623
§ 371 (c)(1),
(2) Date: Feb. 26, 2024

(87) PCT Pub. No.: WO2023/031550
PCT Pub. Date: Mar. 9, 2023

(65) Prior Publication Data
US 2024/0359421 A1     Oct. 31, 2024

(30) Foreign Application Priority Data
Aug. 30, 2021     (FR) ..................................... 21 09019

(51) Int. Cl.
*B32B 37/14*          (2006.01)
*B29C 35/02*          (2006.01)
(Continued)

(52) U.S. Cl.
CPC ........ *B32B 37/146* (2013.01); *B29C 35/0227* (2013.01); *B29C 65/70* (2013.01);
(Continued)

(58) Field of Classification Search
CPC ..... B32B 37/146; B32B 3/12; B32B 2605/18; B32B 2255/26; B32B 2255/02;
(Continued)

(56) References Cited

U.S. PATENT DOCUMENTS

| | | | |
|---|---|---|---|
| 4,680,216 A | 7/1987 | Jacaruso | |
| 5,667,867 A * | 9/1997 | Meier ....................... | B32B 7/12 |
| | | | 428/116 |

(Continued)

FOREIGN PATENT DOCUMENTS

| | | | |
|---|---|---|---|
| EP | 3 686 000 A1 | 7/2020 | |
| FR | 3091901 A1 * | 7/2020 | ............. F02C 7/045 |
| WO | WO 2020/152418 A1 | 7/2020 | |

OTHER PUBLICATIONS

International Search Report issued Oct. 12, 2022 in PCT/FR2022/051623, filed on Aug. 29, 2022, 2 pages.

(Continued)

*Primary Examiner* — John L Goff, II
(74) *Attorney, Agent, or Firm* — Oblon, McClelland, Maier & Neustadt, L.L.P.

(57) ABSTRACT

A method for manufacturing an acoustic panel including a first skin, a second skin and an intermediate structure enclosed between these skins and forming oblique cavities with respect to the latter. The method includes an intermediate polymerization step for fastening the intermediate structure to the first skin in order to increase the compressive strength thereof and in particular to support an automated operation of draping the second skin.

11 Claims, 3 Drawing Sheets

(51) Int. Cl.

| | |
|---|---|
| *B29C 65/70* | (2006.01) |
| *B29C 70/44* | (2006.01) |
| *B32B 3/26* | (2006.01) |
| *B32B 3/30* | (2006.01) |
| *B32B 5/02* | (2006.01) |
| *B32B 7/12* | (2006.01) |
| *B32B 15/14* | (2006.01) |
| *B32B 15/20* | (2006.01) |
| *B29K 63/00* | (2006.01) |
| *B29K 105/08* | (2006.01) |
| *B29K 105/20* | (2006.01) |
| *B29K 307/04* | (2006.01) |
| *B29K 705/02* | (2006.01) |
| *B29L 31/38* | (2006.01) |

(52) U.S. Cl.
CPC .............. *B29C 70/44* (2013.01); *B32B 3/266* (2013.01); *B32B 3/30* (2013.01); *B32B 5/02* (2013.01); *B32B 7/12* (2013.01); *B32B 15/14* (2013.01); *B32B 15/20* (2013.01); *B29K 2063/00* (2013.01); *B29K 2105/08* (2013.01); *B29K 2105/20* (2013.01); *B29K 2307/04* (2013.01); *B29K 2705/02* (2013.01); *B29K 2995/0063* (2013.01); *B29K 2995/0097* (2013.01); *B29L 2031/38* (2013.01); *B32B 2250/40* (2013.01); *B32B 2255/02* (2013.01); *B32B 2255/26* (2013.01); *B32B 2260/023* (2013.01); *B32B 2260/046* (2013.01); *B32B 2262/106* (2013.01); *B32B 2307/102* (2013.01); *B32B 2307/72* (2013.01); *B32B 2605/18* (2013.01)

(58) Field of Classification Search
CPC ........ B32B 2260/023; B32B 2260/046; B32B 2260/021; B32B 2262/106; B32B 2262/101; B32B 2307/102; B32B 2307/72; B32B 2603/00; B32B 1/08; B32B 3/266; B32B 3/30; B32B 5/02; B32B 7/12; B32B 15/14; B32B 15/20; B32B 2250/40; B64D 2033/0206; B64D 33/02; B64D 29/02; F02C 7/045; F02K 1/827; B29D 24/005; B29C 66/72525; B29C 35/0227; B29C 65/70; B29C 70/44; B64C 7/02; G10K 11/172; F05D 2230/00; F05D 2300/603; B29K 2063/00; B29K 2105/08; B29K 2105/20; B29K 2307/04; B29K 2705/02; B29K 2995/0063; B29K 2995/0097; B29L 2031/38
See application file for complete search history.

(56) References Cited

U.S. PATENT DOCUMENTS

| | | | |
|---|---|---|---|
| 2012/0321835 A1* | 12/2012 | Hethcock, Jr. ........ | B32B 37/146 156/247 |
| 2014/0060732 A1* | 3/2014 | Shair .................... | B32B 37/146 156/289 |
| 2019/0039745 A1 | 2/2019 | Haile et al. | |
| 2022/0099022 A1* | 3/2022 | Papin .................... | F02K 1/827 |

OTHER PUBLICATIONS

French Preliminary Search Report & Written Opinion issued May 17, 2022 in FR Application 21 09019, filed on Aug. 30, 2021, 10 pages (with English Translation of Categories of Cited Documents).

* cited by examiner

METHOD FOR MANUFACTURING AN ACOUSTIC PANEL WITH OBLIQUE CAVITIES

TECHNICAL FIELD

The invention relates to the field of acoustic panels intended for the aviation industry.

PRIOR ART

A conventional aircraft propulsion unit comprises acoustic panels, commonly known as "sandwich panels", comprising two skins and an intermediate structure enclosed between them. The intermediate structure is generally a honeycomb structure forming acoustic absorption cavities, or Helmholtz cavities, to reduce the noise generated by the propulsion unit. To this end, the skin intended to be oriented towards the source of the noise is made permeable to air, typically by means of holes passing through this skin to be able to guide the air within the cavities and thus absorb acoustic energy.

Generally speaking, the thickness of the panel determines the length of the cavities and consequently their attenuation capacity. In particular, a longer cavity attenuates longer waves and therefore lower frequencies.

In order to reduce the footprint of the panel whilst attenuating low frequencies generated by the propulsion unit, the cavities are known to be angled in the way described in documents U.S. Pat. No. 3,821,999 and WO92/12854.

Such angling of the cavities leads to a reduction in the compressive strength of the intermediate structure compared to a structure having cavities with an axis normal to the skins.

When panel manufacture comprises automated draping operations, the mechanical pressure applied to the intermediate structure by a draping roller is typically around 0.35 MPa. This pressure may reach 1.5 MPa in zones with geometric singularities, given the corresponding reduction in the contact surface between the roller and the layers. However, it is estimated that the compressive strength of an intermediate structure whose cavities are inclined at an angle of 45° and which has a density comprised between 67 kg/m³ and 104 kg/m³ is typically comprised between 0.2 MPa and 0.5 MPa.

There is therefore a risk that the intermediate structure will be crushed during panel manufacture, requiring part of the draping to be carried out manually, which increases the cost of panel manufacture.

DISCLOSURE OF THE INVENTION

The invention aims to provide an acoustic panel having an intermediate structure forming oblique cavities at a competitive cost and without increasing the mass of the panel.

To this end, the object of the invention is a method for manufacturing an acoustic panel, comprising:

a step of arranging on a mould one or more first layers of a material comprising a resin, so as to form a first skin of the panel, a first step of heating the first layers so as to polymerize the resin, a step of arranging on the first skin an adhesive material, a step of arranging on the adhesive material an intermediate structure comprising cavities which each open out on the one hand on a first surface of the intermediate structure and on the other hand on a second surface of the intermediate structure, the cavities being oblique with respect to the first and second surfaces, such that the adhesive material is enclosed between the first skin and the first surface of the intermediate structure, a step of arranging on the second surface of the intermediate structure one or more second layers of a material comprising a resin, so as to form a second skin of the panel, a third step of heating the assembly formed by the first skin, the intermediate structure and the second skin, so as to polymerize the resin of the second layers.

According to the invention, the method comprises, before arranging the second layers, a second step of heating the assembly formed by the first skin, the adhesive material and the intermediate structure, so as to polymerize the adhesive material.

The second heating step thus enables the intermediate structure to be fixed to the first skin and prevents it from slipping relative to the first skin when the second layers are arranged.

It has been observed that fixing the intermediate structure to the first skin in this way substantially increases the compressive strength of the intermediate structure. Indeed, as the intermediate structure is bonded to the first skin on one side, the cells that form the intermediate structure have much less scope for deformation and are therefore more rigid.

More specifically, it has in particular been found that for an intermediate structure with a density of 67 kg/m³ and having cavities angled at 45 degrees relative to the first surface of this intermediate structure, carrying out said second heating step makes it possible to increase the compressive strength from 0.2 MPa to 1.4 MPa.

The invention thus makes it possible to automate draping operations, in particular the arrangement of said second layers on the intermediate structure, and thus reduces the costs involved in manufacturing the panel.

The invention also produces such a result without increasing the density of the intermediate structure and therefore the mass of the panel.

It is preferable that one or more of said first layers and/or one or more of said second layers are arranged by means of a draping robot.

Of course, the invention also covers methods in which all the draping operations are performed manually.

In one embodiment, the first and third heating steps comprise pressurizing the heated elements with gas.

Said heated elements comprise in this case the first skin of the panel for the first heating step and, for the second heating step, the assembly formed by the first skin, the adhesive material and the intermediate structure.

The maximum pressure applied during the third heating step is preferably lower than the maximum pressure applied during the first heating step.

By way of example, the maximum pressure applied during the first heating step is comprised between six and ten bar and the maximum pressure applied during the third heating step is comprised between two and four bar. Preferably, the second heating step is carried out at a reduced pressure relative to that of the first and third heating steps CH1 and CH3, typically between 0.2 bar and 1.5 bar.

In one embodiment, one or more among the first, second and third heating steps are carried out within an autoclave, and/or the second heating step is carried out under a bladder in an oven or a furnace.

All these heating steps are preferably carried out in an autoclave.

Alternatively, one or more of said heating steps can be carried out using another heating means such as a furnace or an oven.

According to a first alternative embodiment, the method comprises a step of piercing the first skin carried out after the first heating step.

According to a second alternative embodiment, the method comprises a step of piercing the second skin carried out after the third heating step.

These alternatives can be combined.

The method preferably comprises a step of piercing the first skin carried out after the first heating step, wherein cross-linking of the adhesive material is carried out between this piercing step and the second heating step.

Each of the cavities of the intermediate structure preferably extends along an axis forming an angle comprised between 30 degrees and 60 degrees relative to the first surface of the intermediate structure.

For example, this angle can be equal to 45 degrees.

In one embodiment, the intermediate structure comprises a metallic material such as aluminium.

Alternatively, the intermediate structure can comprise an organic material and/or a material comprising synthetic fibres such as Nomex® or a thermoplastic such as PEEK.

In one embodiment, the first layers and the second layers comprise an organic matrix composite.

In one embodiment, the intermediate structure has a density of less than 130 $kg/m^3$, preferably less than or equal to 86 $kg/m^3$.

Other advantages and characteristics of the invention will become apparent on reading the non-limiting, detailed description that follows.

BRIEF DESCRIPTION OF THE DRAWINGS

The detailed description that follows makes reference to the appended drawings in which.

DETAILED DESCRIPTION OF EMBODIMENTS

Figures 1, 2:
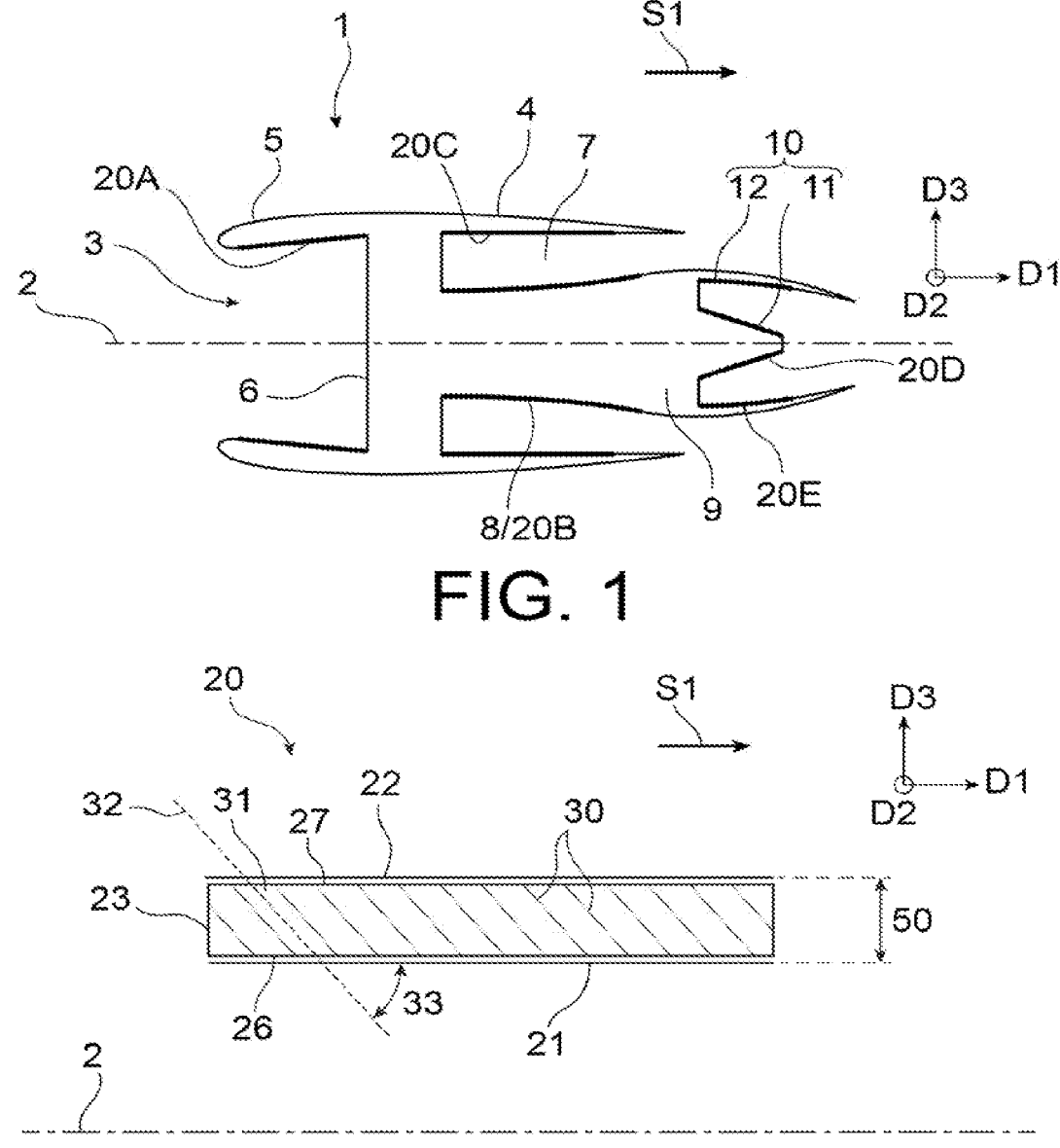
FIG. 1 is a schematic longitudinal section view of an aircraft propulsion unit fitted with acoustic panels.
FIG. 2 is a schematic cross-sectional view of an acoustic panel according to the invention, comprising an intermediate structure having oblique acoustic absorption cavities.

FIGS. 1 and 2 comprise a frame of reference D1, D2 and D3 defining respectively a longitudinal/axial direction, a circumferential/tangential direction and a radial direction which are orthogonal to each other.

FIG. 1 shows in a simplified manner an aircraft propulsion unit 1 comprising a turbomachine 3 and a nacelle 4 extending around a central longitudinal axis 2. In this example, the turbomachine 3 is a turbofan engine.

Hereinafter, the terms "front" and "rear" are considered according to a main gas flow direction S1 in the propulsion unit 1 along the axis 2, which is parallel to the direction D1.

In a manner known per se, the propulsion unit 1 comprises, from the front to the rear, an air inlet 5, a fan 6, a secondary duct 7 delimited radially towards the inside by an internal fairing 8 surrounding a gas generator 9 formed by the turbojet 3 and radially towards the outside by elements of the nacelle 4, and a nozzle 10 for ejecting a primary flow leaving the gas generator 9. The nozzle 10 comprises an ejection cone 11 and an ejection nozzle 12.

The invention relates more specifically to acoustic panels 20 intended to be fitted to such a propulsion unit 1.

In this in no way limiting example, the propulsion unit 1 comprises several acoustic panels 20 as described below, illustrated by bold lines in FIG. 1. These panels 20 include panels 20A forming an inner wall of the air inlet 5, panels 20B forming part of the internal fairing 8 and panels 20C delimiting the secondary duct 7, panels 20D forming an outer wall of the ejection cone 11 and panels 20E forming an inner wall of the ejection nozzle 12.

In this example, each of the panels 20A to 20E extends circumferentially around the axis 2, forming a ring sector. Thus, in particular, each of the panels 20A extends over a respective circumferential sector so as together to form an axis 2 ring. What has just been described for panels 20A applies mutatis mutandis to panels 20B to 20E.

A panel 20 according to the invention is shown in cross-section in FIG. 2, in a sectional plane parallel to the directions D1 and D3.

The panel 20 comprises a first skin 21, a second skin 22 and an intermediate structure 23.

The intermediate structure 23 has an inner surface 26 and an outer surface 27 which are, in the cross-section in FIG. 2, shown flat and parallel to the direction D1. Of course, the inner surface 26 and/or the outer surface 27 can have a curved geometry, both in the cross-section shown in FIG. 2 and/or in other cross-sections.

In this example, the intermediate structure 23 extends in the circumferential direction D2 so as to form a ring sector.

The intermediate structure 23 comprises partitions 30 delimiting cavities 31 which extend both radially and axially.

In this example, the majority of the cavities 31 open out on the one hand on the inner surface 26 and on the other hand on the outer surface of the intermediate structure 23.

Each of the cavities 31 extends along an axis 32 oblique to the inner 26 and outer 27 surfaces.

In this example, the axis 32 of each of the cavities 31 forms an angle 33 of around 45° with the surfaces 26 and 27.

In terms of the geometry of the cavities 31, the partitions 30 are designed in this example such that each of the cavities 31 has a hexagonal cross-section in a plane normal to the axis 32. Alternatively, one or more of the cavities 31 can comprise a triangular, square or other cross-section. The cavities 31 can have any other shape to avoid telegraphing in particular.

The first skin 21, also known as the inner skin, is arranged radially on one side of the intermediate structure 23 so as to cover the inner surface 26 of this structure 23. As the inner skin 21 is flush with the inner surface 26 of the intermediate structure 23, the aforementioned angle 33 is also formed between the axis 32 of the cavities 31 and the inner skin 21.

The second skin 22, also known as the outer skin, is arranged radially on the other side of the intermediate structure 23 so as to cover the outer surface 27 of the intermediate structure 23.

In this example, the outer skin 22 is solid, while the inner skin 21 comprises openings (not shown) designed to guide air into the cavities 31 in order to absorb acoustic energy.

In this example, the panel 20 has a thickness 50, or radial dimension, comprised between 30 mm and 40 mm and the skins 21 and 22 each have a thickness comprised between 0.2 mm and 2 mm, for example 1.0 mm.

The panel 20 is preferably manufactured using a method comprising the steps described below.

Figure 3:
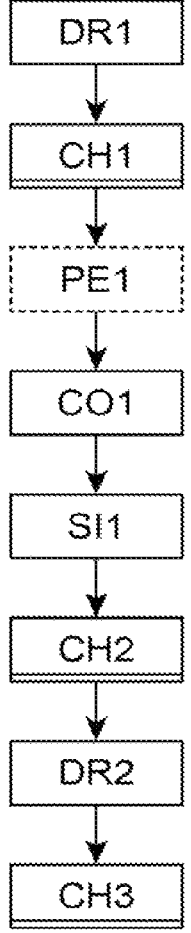
FIG. 3 is a flow chart of the production of an acoustic panel according to a first embodiment.

With reference to FIG. 3, a draping step DR1 is carried out in which layers are arranged on a mould (not shown) so as to form the inner skin 21 of the panel 20.

The layers comprise an organic matrix composite, for example carbon fibres, and are pre-impregnated with a polymerizable resin, for example epoxy.

In one alternative embodiment, the layers each comprise juxtaposed strips. In this example, the layers are arranged on the mould by means of a draping robot (not shown) which comprises in particular a roller to press the layers against the mould and against each other.

The layers arranged in this way are placed in an autoclave (not shown) with the mould in order to undergo a first heating step CH1.

The autoclave chamber is pressurized with gas, in this example to a maximum pressure comprised between six and ten bar, and the temperature is increased to reach a level comprised between 100° C. and 250° C., and more preferably comprised between 15° and 220° C., so as to polymerize the resin contained in the layers forming the inner skin 21.

Once the inner skin 21 has cooled and hardened, a piercing step PE1 is carried out so as to form the aforementioned openings.

A layer of a polymerizable adhesive material, for example epoxy, is then placed on the inner skin 21 (step CO1), followed by the intermediate structure 23 (step SI1) such that the adhesive material is interposed between the inner skin 21 and the inner surface 26 of the intermediate structure 23. The adhesive layer is cross-linked (for example by blowing hot air) before the intermediate structure 23 is removed, so as not to obstruct the acoustic openings made in step PE1.

In this example, the intermediate structure 23 comprises aluminium and has a density of around 86 kg/m³.

The assembly formed by the inner skin 21, the adhesive material and the intermediate structure 23 is then placed in the autoclave chamber in order to carry out a second heating step CH2.

The autoclave chamber is pressurized with gas, in this example to a reduced maximum pressure which is in this example comprised between 0.2 and 1.5 bar, and the temperature is increased to reach a level comprised between 150° C. and 230° C., so as to at least partly polymerize the layer of the adhesive material. Given that this pressure is reduced, this step CH2 can alternatively be carried out outside of the autoclave, for example under a bladder in a furnace or an oven.

This second heating step CH2 enables the intermediate structure 23 to be fixed to the inner skin 21.

A second draping step DR2 is then carried out in which layers similar to those described above are arranged on the outer surface 27 of the intermediate structure 23, so as to form the outer skin 22 of the panel 20.

The panel 20 is then placed in the autoclave chamber in order to undergo a third heating step CH3.

The autoclave chamber is pressurized with gas, in this example to a maximum pressure comprised between two and four bar, and the temperature is increased to reach a level comprised between 100° C. and 250° C., and preferably comprised between 150° C. and 230° C., so as to polymerize the resin of the layers forming the outer skin 22.

Of course, the invention is not limited to the description set out above and the method can in particular comprise additional steps and/or steps carried out in a different order.

Figure 4:
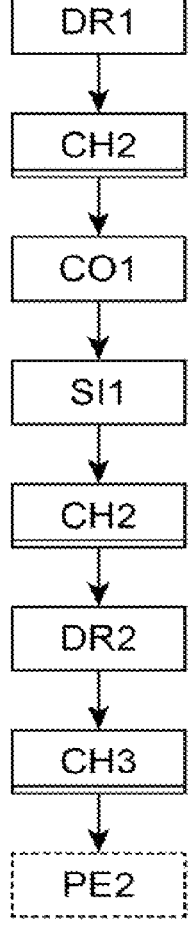
FIG. 4 is a flow chart of the production of an acoustic panel according to a second embodiment.

For example, with reference to FIG. 4, the step of piercing PE1 the inner skin 21 can be dispensed with and a step of piercing PE2 the outer skin 22 can be carried out once the outer skin 22 having undergone the third heating step CH3 has cooled and hardened.

Furthermore, all or part of the draping can alternatively be carried out manually and/or the heating steps CH1, CH2 and/or CH3 can be carried out using a heating means other than an autoclave and/or by using any appropriate tooling and pressurization means.

Moreover, the layers of the inner 21 and/or outer 22 skins can also be made of a stack of different materials, such as glass fibre and carbon fibre layers.

The invention claimed is:

1. A method for manufacturing an acoustic panel, comprising:
   a step of arranging, on a mold, one or more first layers of a material comprising a resin, so as to form a first skin of the panel,
   a first step of heating the first layers so as to polymerize the resin, and pressurizing the first layers with gas,
   a step of arranging, on the first skin, an adhesive material,
   a step of arranging, on the adhesive material, an intermediate structure comprising cavities which each open out on a first surface of the intermediate structure and on a second surface of the intermediate structure, the cavities being oblique with respect to the first and second surfaces, such that the adhesive material is enclosed between the first skin and the first surface of the intermediate structure,
   a second step of heating an assembly formed by the first skin, the adhesive material, and the intermediate structure, so as to polymerize the adhesive material
   a step of arranging, on the second surface of the intermediate structure, one or more second layers of a material comprising a resin, so as to form a second skin of the panel, and
   a third step of heating an assembly formed by the first skin, the intermediate structure, and the second skin, so as to polymerize the resin of the second layers, and pressurizing the assembly with gas, a maximum pressure applied during the third heating step being lower than a maximum pressure applied during the first heating step.

2. The method according to claim 1, wherein one or more of said first layers and/or one or more of said second layers are arranged with a draping robot.

3. The method according to claim 1, wherein the maximum pressure applied during the first heating step is comprised between six and ten bar and wherein the maximum pressure applied during the third heating step is comprised between two and four bar, and the second heating step is carried out at a reduced pressure relative to that of the first and third heating steps.

4. The method according to claim 1, wherein one or more among the first, second and third heating steps are carried out within an autoclave, and/or the second heating step is carried out under a bladder in an oven or a furnace.

5. The method according to claim 1, further comprising a step of piercing the first skin carried out after the first heating step and/or a step of piercing the second skin carried out after the third heating step.

6. The method according to claim 1, further comprising a step of piercing the first skin carried out after the first heating step, wherein cross-linking of the adhesive material is carried out between the piercing step and the second heating step.

7. The method according to claim 1, wherein each of the cavities of the intermediate structure extends along an axis forming an angle comprised between 30 degrees and 60 degrees relative to the first surface of the intermediate structure.

8. The method according to claim 1, wherein the intermediate structure comprises a metallic material, and wherein the first layers and the second layers comprise an organic matrix composite.

9. The method according to claim 1, wherein the intermediate structure has a density of less than 130 kg/m$^3$.

10. The method according to claim 3, wherein the reduced pressure is between 0.2 bar and 1.5 bar.

11. The method according to claim 8, wherein the metallic material is aluminum.

* * * * *